(12) United States Patent
Nachimuthu et al.

(10) Patent No.: US 9,015,388 B2
(45) Date of Patent: Apr. 21, 2015

(54) CONTROLLING ACCESS TO STORAGE IN A COMPUTING DEVICE

(71) Applicant: Intel Corporation, Santa Clara, CA (US)

(72) Inventors: Murugasamy Nachimuthu, Beaverton, OR (US); Mohan Kumar, Aloha, OR (US); Dimitrios Ziakas, Hillsboro, OR (US)

(73) Assignee: Intel Corporation, Santa Clara ( * ) Notice: Subject to any disclaimer, the term of this patent is extended or adjusted under 35 U.S.C. 154(b) by 58 days.

(21) Appl. No.: 13/930,643

(22) Filed: Jun. 28, 2013

(65) Prior Publication Data

US 2015/0006871 A1 Jan. 1, 2015

(51) Int. Cl.
*G06F 3/06* (2006.01)
*G06F 12/14* (2006.01)
*G06F 21/57* (2013.01)
*G06F 13/38* (2006.01)

(52) U.S. Cl.
CPC .......... *G06F 12/1408* (2013.01); *G06F 21/575* (2013.01)

(58) Field of Classification Search
None
See application file for complete search history.

(56) References Cited

U.S. PATENT DOCUMENTS

2008/0301508 A1* 12/2008 Kodama et al. ............... 714/719
2008/0320254 A1* 12/2008 Wingard et al. ............... 711/157
2009/0172690 A1* 7/2009 Zimmer et al. ............... 718/104

* cited by examiner

*Primary Examiner* — Scott Sun
(74) *Attorney, Agent, or Firm* — Chapin IP Law, LLC

(57) ABSTRACT

In an embodiment, a computing device may include a control unit. The control unit may acquire a request from a central processing unit (CPU), contained in the computing device, that may be executing a basic input/output system (BIOS) associated with the computing device. The request may include a request for a value that may represent a maximum authorized storage size for a storage contained in the computing device. The control unit may generate the value and send the value to the CPU. The CPU may generate a system address map based on the value. The CPU may send the system address map to the control unit which may acquire the system address map and configure an address decoder, contained in the computing device, based on the acquired system address map.

20 Claims, 7 Drawing Sheets

CONTROLLING ACCESS TO STORAGE IN A COMPUTING DEVICE

BACKGROUND

A computing device may use one or more storage systems to store information. The information may include, for example, data and/or executable instructions. The storage systems may include a primary storage and a secondary storage. A primary storage may be a storage that is directly accessible to a processor that may be contained in the computing device. The processor may access the primary storage via a memory bus that may contain provisions for transferring information between the processor and the primary storage. A secondary storage may be a storage that may not be directly accessible to the processor. Here, information may be transferred between the processor and the secondary storage via one or more input/output (I/O) channels that may be part of an I/O bus.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
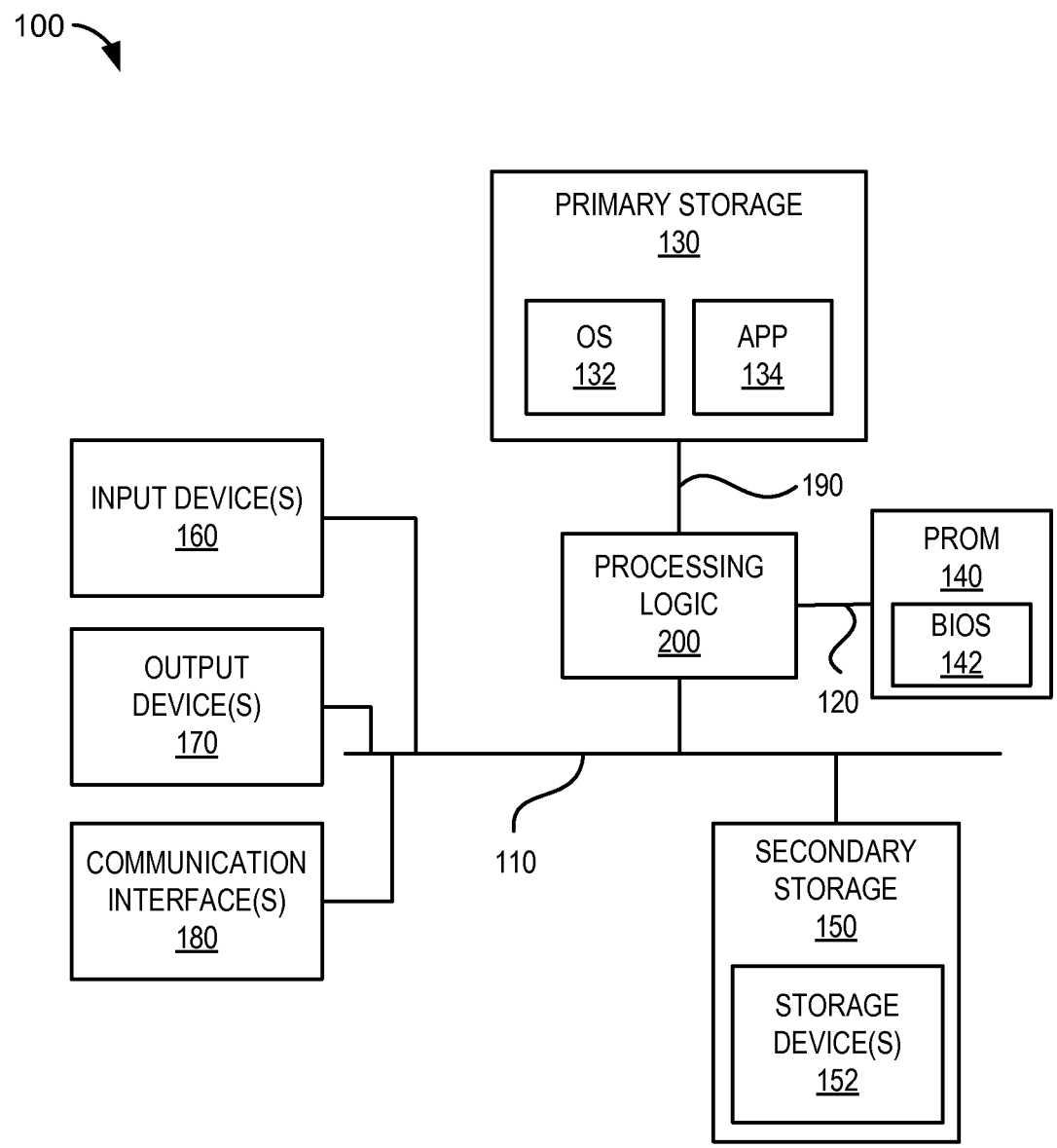
FIG. 1 illustrates a block diagram of an example embodiment of a computing device.

The following detailed description refers to the accompanying drawings. The same reference numbers in different drawings may identify the same or similar elements. Also, the following detailed description does not limit the invention.

A computing device may include storage that the computing device may use to store information (e.g., data, computer-executable instructions). The storage may store the information in one or more storage modules. The storage modules may be volatile and/or non-volatile. A volatile storage module may store information that is lost after power is removed from the volatile storage module. A non-volatile storage module may store information that may be retained after power is removed from the non-volatile storage module. Examples of storage modules may include, but are not limited to, dual-inline memory modules (DIMMs) and single-inline memory modules (SIMMs).

For example, a computing device may contain a processor, one or more non-volatile storage modules (including non-volatile memory), and one or more volatile storage modules (including volatile memory). The processor may use the storage modules to store information for a user of the computing device. The information may include, for example, data and/or applications that may be used by the computing device. The storage modules may be powered by power applied to the computing device.

Information stored in the non-volatile storage modules may enable the information to be persisted such that the information may be retained after power is lost to the computing device. The processor may access (e.g., read) the persisted information from the non-volatile storage modules after power is restored to the computing device. On the other hand, information stored in the volatile storage modules may be lost after power is lost to the computing device. The lost information may not be recoverable after power is restored to the computing device.

A storage module may contain one or more memory devices that may store information for the storage. A memory device may contain one or more arrays where an array may include one or more memory cells that may be used to store information in the memory device.

A memory cell may be associated with an address. The address may be used to specify a location of the memory cell in an array. Information may be written into and/or read from the memory cell using the address associated with the memory cell.

For example, a memory cell in a memory device may be associated with a particular address (e.g., 0x100). The memory cell may be accessed (e.g., read, written) using the address of the memory cell.

In some memory devices, an address may be associated with a group of one or more memory cells. For example, a memory device may be byte addressable where an address may be associated with eight memory cells. Here, a memory cell may store one bit of information.

In some memory devices, arrays of memory cells may be organized in multiple dimensions (e.g., a 2-dimensional (2D) arrays, 3-dimensional (3D) arrays). Here, a group of memory cells associated with an address may physically reside across multiple arrays. In other words, a memory address may be associated with a combination of multiple memory cells from multiple arrays.

Techniques described herein may be implemented in a computing device. Examples of computing devices that may implement techniques described herein may include, but are not limited to, smart phones, tablets, ultrabooks, laptops, mainframes, servers, and desktop computers.

FIG. 1 illustrates a block diagram of an example embodiment of a computing device 100 that may implement techniques described herein. Referring to FIG. 1, computing device 100 may include various components such as, for example, processing logic 200, primary storage 130, a programmable read-only memory (PROM) 140, secondary storage 150, one or more input devices 160, one or more output devices 170, and/or one or more communication interfaces 180.

It should be noted that FIG. 1 illustrates an example embodiment of computing device 100. Other embodiments of computing device 100 may include more components or fewer components than the components illustrated in FIG. 1. Further, the components may be arranged differently than as illustrated in FIG. 1.

For example, in an embodiment of computing device 100, secondary storage 150 may be contained at a remote site that provides "cloud" storage. The site may be accessible to computing device 100 via a communications network, such as, for example, the Internet. A communication interface 180 may be used to interface the computing device 100 with the communications network.

Also, it should be noted that features provided by various components contained in other embodiments of computing device 100 may be distributed among the components differently than as described herein.

Computing device 100 may include an input/output (I/O) bus 110 that may enable communication among components in computing device 100. The components may include, for example, processing logic 200, secondary storage 150, one or more input devices 160, one or more output devices 170, and/or one or more communication interfaces 180. The communication may involve, for example, transferring control signals and/or data between the components via I/O bus 110. I/O busses that may be used to implement I/O bus 110 may include, for example, serial AT attachment (SATA), peripheral component interconnect (PCI), PCI express (PCI-e), universal serial bus (USB), small computer system interface (SCSI), serial attached SCSI (SAS), or some other I/O bus.

Computing device 100 may include a bus 120 that may enable communication between PROM 140 and processing logic 200. The communication may involve, for example, transferring control signals and/or data between the processing logic 200 and PROM 140 via bus 120. An example of a bus that may be used to implement bus 120 is the low pin count (LPC) bus.

Computing device 100 may include a memory bus 190 that may enable information stored in primary storage 130, to be transferred between processing logic 200 and primary storage 130. The information may include, for example, computer-executable instructions and/or data that may be executed, manipulated, and/or otherwise processed by processing logic 200.

Input devices 160 may include one or more devices that may be used to input information into computing device 100. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, and/or some other input device.

The information may include spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more devices that may output information from computing device 100. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device.

Output devices 170 may be directed by, for example, processing logic 200, to output the information from computing device 100. Outputting information on an output device 170 may include, for example, presenting (e.g., displaying, printing) the information on the output device 170. The information may include, for example, text, graphical user interface (GUI) elements (e.g., windows, widgets, and/or other GUI elements), audio (e.g., music, sounds), and/or other information that may be outputted by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G (e.g., 4G long-term evolution (LTE)) networks.

Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 100 to a communications network.

Primary storage 130 and/or secondary storage 150 may include one or more storage modules that may contain one or more memory devices. A memory device may support, for example, serial or random access to information contained in the memory device. A memory device that supports serial access to information stored in the memory device may be referred to as a serial memory device. A memory device that supports random access to information stored in the memory device may be referred to as a random access memory (RAM) device.

A memory device may be, for example, a volatile or non-volatile memory device. A volatile memory device may be a memory device that may lose information stored in the device after power is removed from the device. A non-volatile memory device may be a memory device that may retain information stored in the device after power is removed from the device. Examples of memory devices may include dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, 3D cross point memory devices (e.g., phase change memory (PCM) devices), nanowire-based devices, resistive RAM (RRAM) devices, serial electrically erasable programmable ROM (SEEPROM) devices, spin transfer torque (STT) MRAM devices, and serial flash devices.

Primary storage 130 may be accessible to processing logic 200 via memory bus 190. Primary storage 130 may be a tangible non-transitory storage that may store information. The information may include computer-executable instructions and/or data that may implement operating system (OS) 132 and application (APP) 134 or parts thereof. The information may be executed, interpreted, manipulated, and/or otherwise processed by processing logic 200. Primary storage 130 may be implemented using one or more memory devices that may store the information. The memory devices may include volatile and/or non-volatile memory devices.

OS 132 may be a conventional operating system that may implement various conventional operating system functions that may include, for example, (1) scheduling one or more portions of APP 134 to run on (e.g., be executed by) the processing logic 200, (2) managing primary storage 130, and (3) controlling access to various components in computing device 100 (e.g., input devices 160, output devices 170, communication interfaces 180, secondary storage 150) and information received and/or transmitted by these components.

Examples of operating systems that may be used to implement OS 132 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 8, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

APP 134 may be a software application that may execute under control of OS 132 on computing device 100. APP 134 and/or OS 132 may contain provisions for processing transactions that may involve storing information in secondary storage 150. These provisions may be implemented using data and/or computer-executable instructions contained in APP 134 and/or OS 132.

PROM 140 may provide a non-volatile storage that may include computer-executable instructions that may implement, among other things, a basic input/output system (BIOS) 142. The instructions may also include instructions that may implement software for use in establishing a configuration of computing device 100. The non-volatile storage that may be provided by PROM 140 may include one or more non-volatile storage memory devices, such as non-volatile storage memory devices described above.

Secondary storage 150 may be a tangible non-transitory storage that may store information for computing device 100. The information may include, for example, computer-executable instructions and/or data. The information may be executed, interpreted, manipulated, and/or otherwise processed by processing logic 200.

Secondary storage may include one or more storage devices 152 that may store the information. The storage devices 152 may be accessible to processing logic 200 via I/O bus 110. The storage devices 152 may be volatile or non-volatile. Examples of storage devices 152 may include magnetic disk drives, optical disk drives, random-access memory (RAM) disk drives, flash drives, solid-state disks (SSDs), and/or hybrid drives. The information may be stored on one or more tangible non-transitory computer-readable media contained in the storage devices 152. Examples of tangible non-transitory tangible computer-readable media that may be contained in the storage devices may include magnetic discs, optical discs, volatile memory devices, and/or non-volatile memory devices.

Processing logic 200 may include logic for interpreting, executing, and/or otherwise processing information. The information may include information that may be stored in primary storage 130 and/or secondary storage 150. In addition, the information may include information that may be acquired (e.g., read, received) by one or more input devices 160 and/or communication interfaces 180.

Processing logic 200 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process the information. Processing logic 200 may comprise a single core or multiple cores.

Figure 2:
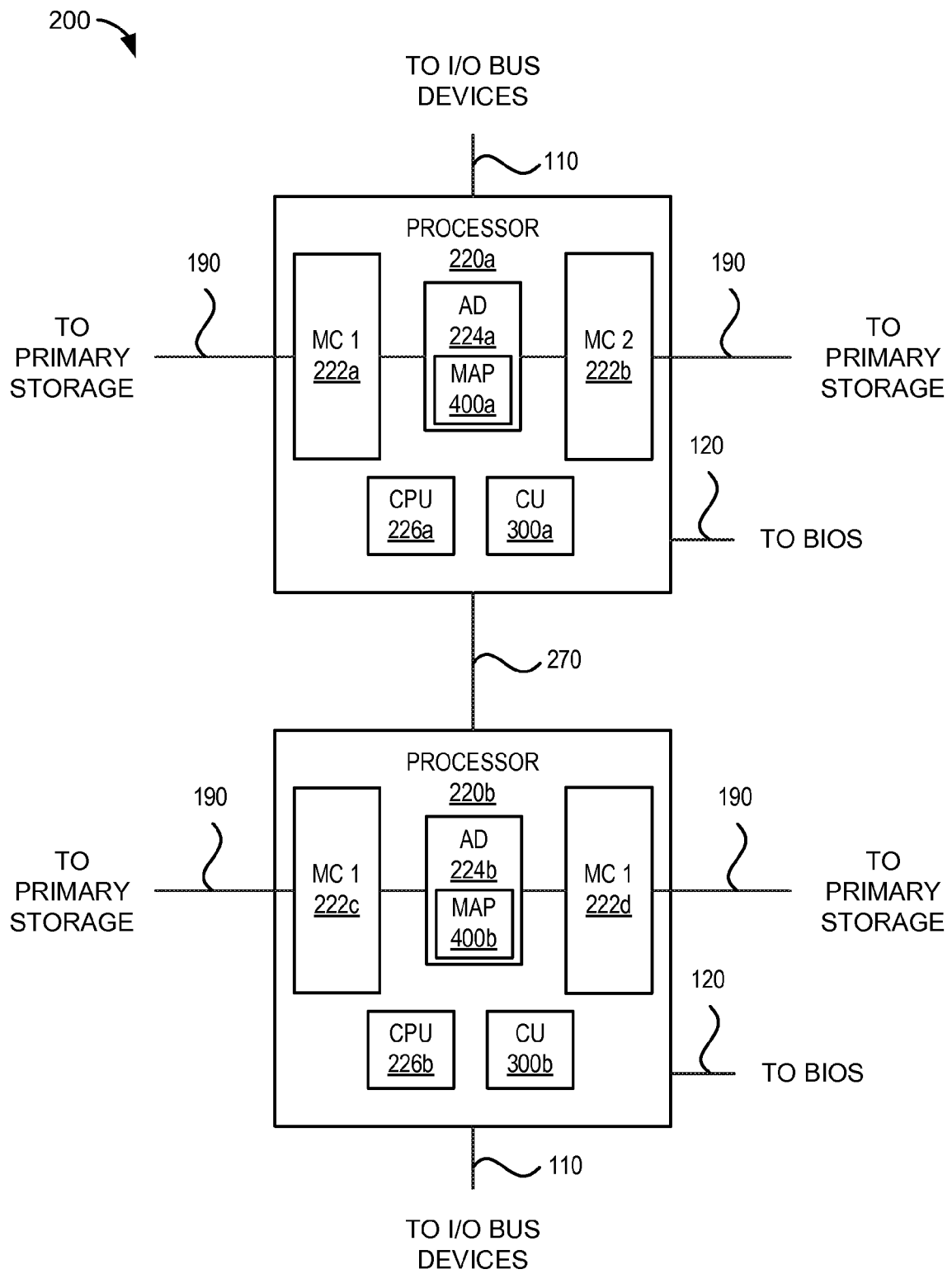
FIG. 2 illustrates a block diagram of an example embodiment of processing logic.

FIG. 2 illustrates an example embodiment of processing logic 200. Referring to FIG. 2, processing logic 200 may include one or more processors 220, such as processor 220*a* and processor 220*b*. A processor 220 may include one or more memory controllers (MCs) 222, an address decoder (AD) 224, a central processing unit (CPU) 226, bus 270, and/or a control unit (CU) 300. For example, processor 220*a* may include MCs 222*a-b*, AD 224*a*, CPU 226*a*, and/or CU 300*a*. Processor 220*b*, for example, may include MCs 222*c-d*, AD 224*b*, CPU 226*b*, and/or CU 300*b*

A memory controller 222 may include logic that may be used to, for example, control and/or manage an operation of one or more storage modules that may be contained in primary storage 130. The storage modules may contain memory devices that may be used to store information. The memory devices may include volatile and/or non-volatile memory devices. The memory devices may be, for example, byte addressable.

For example, memory controller 222*a* may control access to a storage module such as, for example, a DIMM. The storage module may be contained in primary storage 130. The storage module may contain one or more memory devices where the memory devices may include volatile memory devices such as, for example, DRAM, and/or byte-addressable non-volatile memory devices such as, for example, byte-addressable 3D cross point memory devices.

AD 224 may be used to decode addresses supplied, for example, by CPU 226. Decoding may include, for example, identifying storage modules (e.g., DIMMs) that may be contained in primary storage 130 that may be associated with the addresses. AD 224 may include a map 400 that may be used by AD 224 to identify the storage modules.

Map 400 may include information that may associate an address with, for example, a storage module contained in storage such as, primary storage 130. For example, CPU 226*a* may provide an address that is associated with a location in primary storage 130. AD 224*a* may decode the address. Decoding may include, for example, identifying a DIMM in primary storage 130 that contains the location. Map 400*a* may include information that may map addresses to particular DIMMs contained in primary storage 130. AD 224*a* may use map 400*a* as a lookup table to identify the DIMM in primary storage 130 that may be associated with the address.

Information included in map 400 may be generated based on a system address map. A system address map may include information about regions contained in storage such as, for example, primary storage 130. A region may be defined, for example, by a base address, size of the region, and/or attributes associated with the region. A region may be associated with one or more storage modules contained in the storage. For example, a region in primary storage 130 may be associated with a base address and size that spans multiple DIMMs contained in primary storage 130.

CPU 226 may include logic that may execute computer-executable instructions and manipulate data contained in storage, such as, primary storage 130. Logic included in CPU 226 may include an instruction control unit (ICU) and an arithmetic logic unit (ALU). The ICU may include logic that may enable the CPU 226 to fetch and decode computer-executable instructions from storage such as, for example, primary storage 130. The ICU may also include logic that may control an execution of the fetched instructions. The ALU may include logic that may enable the CPU 226 to execute the fetched instructions. Here, execution may include, for example, performing various arithmetic and/or logical functions based on instructions that may be fetched and decoded by the ICU.

Bus 270 may be a wired point-to-point interconnect bus that be used to exchange information between processors 220a and 220b. The information may be exchanged using one or more protocols. Bus 270 may include control and/or data signals that may be used to exchange the information.

Figure 3:
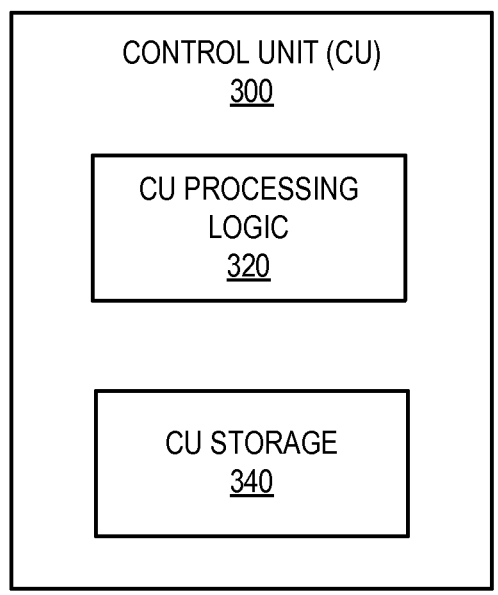
FIG. 3 illustrates a block diagram of an example embodiment of a control unit.

CU 300 may include logic that may be used, among other things, to configure information contained in, for example, map 400. FIG. 3 illustrates an example embodiment of CU 300. Referring to FIG. 3, CU 300 may include CU processing logic 320 and/or CU storage 340.

CU processing logic 320 may include logic that may be used to perform various functions associated with configuring map 400. As will be described further below, map 400 may include one or more entries where an entry may contain one or more fields. CU processing logic 320 may include logic that may be used to configure certain fields contained in the entries.

CU storage 340 may be a tangible non-transitory storage that may be used to store information for CU 300. The information may include, for example, computer-executable instructions and/or data. The computer-executable instructions may include, for example, instructions that may be executed by CU processing logic 320. The computer-executable instructions may include, for example, computer-executable instructions that when executed by CU processing logic 320 may implement one or more techniques described herein. The data may include, for example, data that CU processing logic 320 may use to configure map 400.

Figure 4:
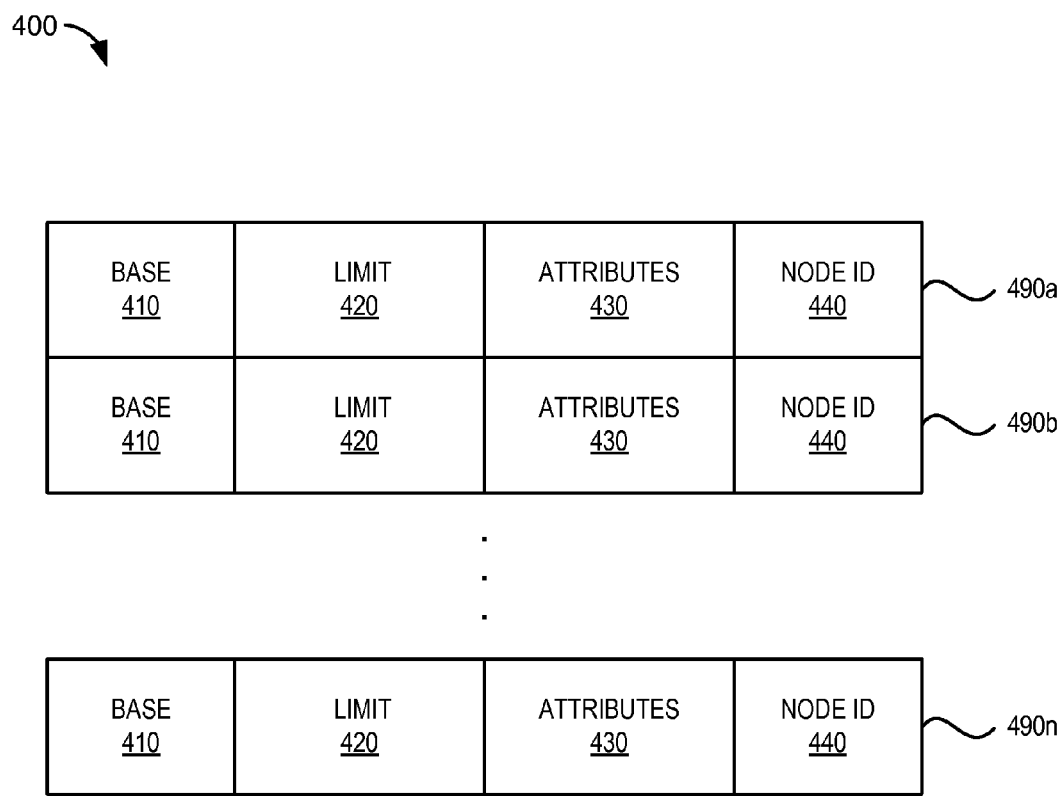
FIG. 4 illustrates an example embodiment of a map that may be used to associate an address with a storage module contained in a storage.

As noted above, map 400 may include information that may associate an address with a storage module contained in storage, such as primary storage 130. FIG. 4 illustrates an example embodiment of map 400.

Referring to FIG. 4, map 400 may be a data structure that may include one or more entries 490a-n. Examples of data structures that may be used to implement map 400 may include a table, a database, a linked-list, and an array.

An entry 490 may be associated with a range of addresses in storage. The range of addresses may be associated with a region in the storage. The range of addresses may map to, for example, one or more storage modules that may be contained in the storage. For example, an entry 490 may be associated with a range of addresses in primary storage 130. The range of addresses may map to a DIMM contained in primary storage 130.

An entry 490 may include various fields. For example, as illustrated in FIG. 4, an entry 490 may include a base field 410, a limit field 420, an attributes field 430, and a node identifier (ID) field 440. Note that entry 490 is an example of an entry that may be contained in an embodiment of map 400. Other embodiments of map 400 may include entries that contain more fields or fewer fields than illustrated in FIG. 4.

The base field 410 may include a value that may specify a base address associated with an entry 490. The base address may map to an address associated with a storage module. For example, the base field 410 may include a value that may represent an address. The address may be a starting address of region of primary storage 130 associated with a DIMM contained in primary storage 130.

The limit field 420 may include a value that may be used to identify an upper address of a range of addresses associated with an entry 490. For example, limit field 420 may include a value that may represent an address that specifies an ending address associated with a range of addresses associated with an entry 490. Alternatively or in addition to, limit field 420 may include a value that in combination with a value specified in the base field 410 may be used to identify an upper address associated with the entry 490. For example, limit field 420 may include a size value that along with a value in the base field 410 may be used to identify a value that may represent an upper address of a range of addresses associated with the entry 490.

The attributes field 430 may include attribute information for the range of addresses that may be associated with an entry 490. The attribute information may include information that may describe, for example, one or more characteristics of storage associated with the range of addresses.

For example, the attribute information contained in attributes field 430 of an entry 490 may indicate whether a range of addresses associated with the entry 490 are considered cache or non-cache memory. Here, cache memory may refer to storage that may be used as a cache memory by a processor 220 and non-cache memory may refer to storage that may be used as a non-cache memory (e.g., backing store) by the processor 220. The, cache memory may include, for example, a level 1 (L1) cache and/or a level 2 (L2) cache memory that may be used by the processor 220. Non-cache memory may include, for example, non-volatile storage that may be used by processor 220. The non-volatile storage may be contained, for example, in a non-volatile memory device that may be contained on a DIMM in primary storage 130.

The attribute information included in attributes field 430 may include information that may indicate, for example, whether a range of addresses associated with the entry 490 includes storage that is volatile or non-volatile. For example, an entry 490 may be associated with a range of addresses for a region of primary storage 130 that includes a DIMM having non-volatile memory devices. The attributes field 430 for the entry 490 may contain information that indicates the entry 490 is associated with a range of address that includes storage that is non-volatile.

The node ID field 440 may include information about, for example, one or more storage modules that may be associated with the range of addresses. For example, suppose primary storage 130 contains a first storage module and a second storage module that store information associated with addresses contained in the range of addresses. A node ID field 440 of an entry 490 associated with the range of address may include a value that may identify the first and second storage modules.

A storage module may be added to storage. An authorization scheme may be employed that may determine whether the added storage module may be utilized. For example, suppose a DIMM containing non-volatile memory devices is added to primary storage 130. Computing device 100 may employ an authorization scheme that may, for example, require an authentication code (e.g., an authorization key) to be supplied before the DIMM may be used by computing device 100 to store information to and/or retrieve information from the DIMM.

The authentication code may specify an amount and/or type of storage that may be used by a particular processor. For example, suppose a DIMM containing 4 GB of non-volatile storage is added to primary storage 130. Computing device 100 may employ an authorization scheme that may, for example, require an authentication code to be supplied before the full 4 GB of non-volatile storage may be used by a processor 220. Here, the authentication code may, for example, indicate that the processor 220 is authorized to use the full 4 GB of non-volatile storage provided by the DIMM.

Figure 5:
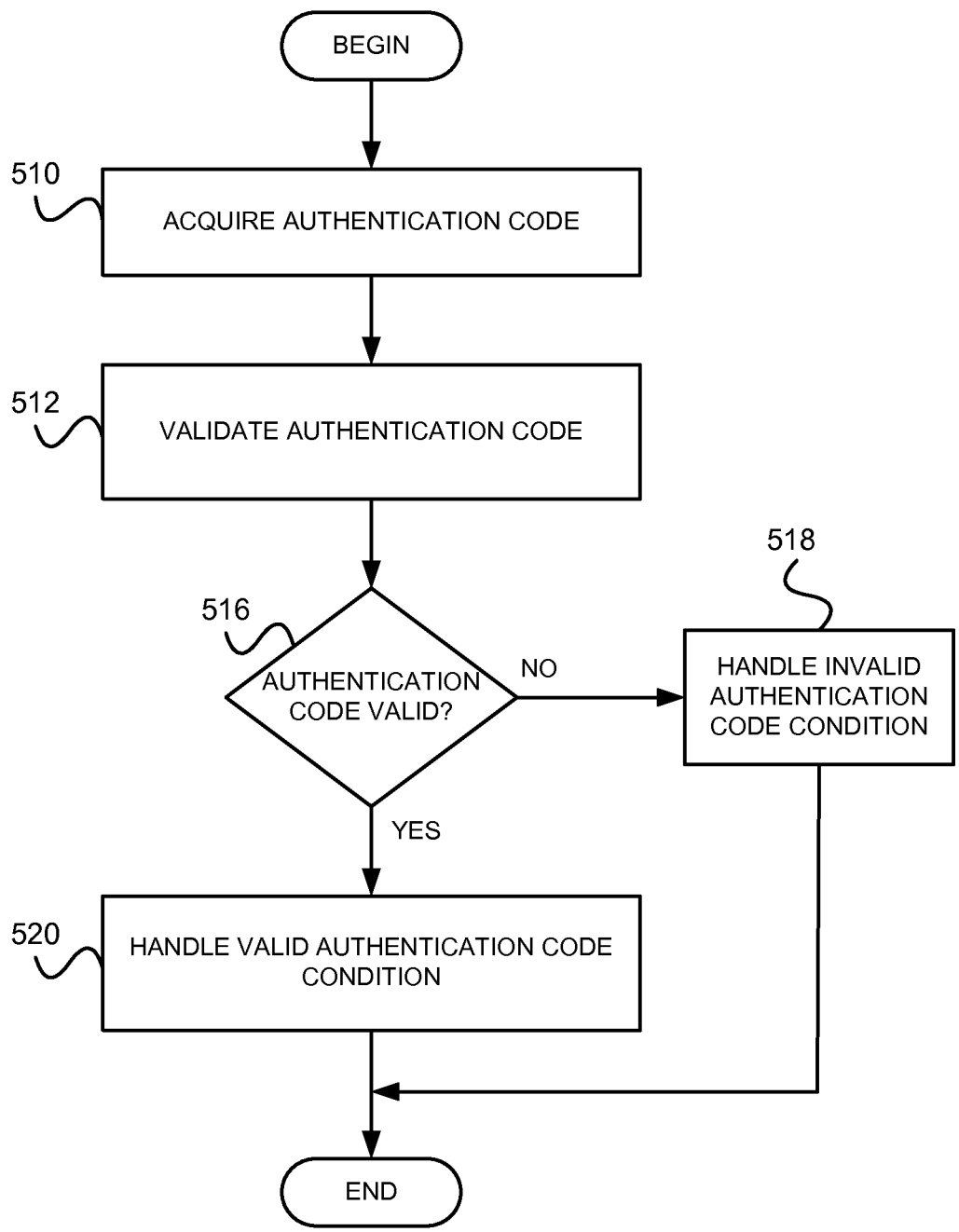
FIG. 5 illustrates a flow diagram of example acts that may be used to process an authentication code associated with a storage module.

FIG. 5 illustrates a flow diagram of example acts that may be used to process an authentication code associated with a storage module. The authentication code may be used to enable usage of the storage module by a computing device, such as computing device 100.

Note that FIG. 5 illustrates example acts that may be associated with an example of an authorization scheme that may be used to enable usage of a storage module in a computing device. It should be noted that in other embodiments, other authorization schemes (e.g., username/password) and/or other acts may be used to enable usage of a storage module in a computing device.

Referring now to FIG. 5, at block 510 an authentication code may be acquired. For example, the authentication code may include a key that may be provided to a user of computing device 100 by a vendor of processing logic 200. The user may enter the key into computing device 100, for example, after the user adds the storage module to primary storage 130. A CPU 226 executing BIOS 142 may acquire the key from the user via, for example, an input device 160. CU 300 may acquire the key from the CPU 226.

At block 512, the authentication code may be validated. For example, the above acquired key may be generated based on an identifier that may identify processing logic 200 (e.g., a serial number associated with processing logic 200). CPU 226 and/or CU 300 may validate the key. Validating the key may include executing instructions (e.g., contained in BIOS 142) that may implement an algorithm that may take into consideration the identifier associated with processing logic 200.

At block 516, a check may be performed to determine whether the authentication code is valid. For example, validating the above key may produce a result. The result may indicate whether the key is valid. At block 516, the result may be checked to determine whether the key is valid.

If the authentication code is not valid, at block 518, an invalid authentication code condition is handled. Handling the invalid authentication code condition may include, for example, displaying a message on an output device 170 that indicates the authentication code is invalid and/or storing an indication that a valid authentication code has not been supplied for the added storage module. The indication may be stored, for example, in CU storage 340.

If the authentication code is valid, at block 520, the valid authentication code is handled. Handling the valid authentication code may include storing the authentication code in storage such as, for example, CU storage 340.

An authorization scheme may be used to authorize certain types of storage and/or a size of storage that may be used by processing logic 200. For example, suppose a key stored in CU storage 300 authorizes processor 220a to use a maximum size of 4 gigabytes (GBs) of non-volatile storage. Now suppose, for example, that primary storage 130 contains a DIMM that has 4 GB of non-volatile storage and that a DIMM is added to primary storage 130 that contains an additional 4 GB of storage (for a total of 8 GB of non-volatile storage). Since the key indicates that processor 220a may utilize a maximum of 4 GB of non-volatile storage, the additional 4 GB of added non-volatile storage may not be used by the processor 200a until a key is supplied that enables the use of the full 8 GB of non-volatile storage by the processor 200a.

A system address map may be generated based on a size of storage in a computing device. The system address map may be used to configure one or more address decoders that may be used to the storage. For example, a system address map may be generated for computing device 100 based on a size of primary storage 130. The generated system address map may be used to identify information that may be used to configure maps 400a-b in address decoders 224a-b, respectively.

A system address map may be used as a starting point for identifying information that may be used to configure one or more address decoders and may be adjusted based on a size of storage and/or types of storage that the computing device may be authorized to use and the adjusted map may be used to configure the address decoders. For example, primary storage 130 may contain 8 GB of non-volatile storage. A key contained in CU storage 340 may indicate that computing device 100 is authorized to use only 4 GB of non-volatile storage. A system address map generated by a CPU 226 executing BIOS 142 may indicate that primary storage 130 contains 8 GB of non-volatile storage. Since computing device 100 is authorized to use only 4 GB of non-volatile storage, the system address map may be adjusted to enable access to 4 GB of the non-volatile storage. Information that may be used to configure maps 400a-b may be identified based on the adjusted system address map.

Figure 6:
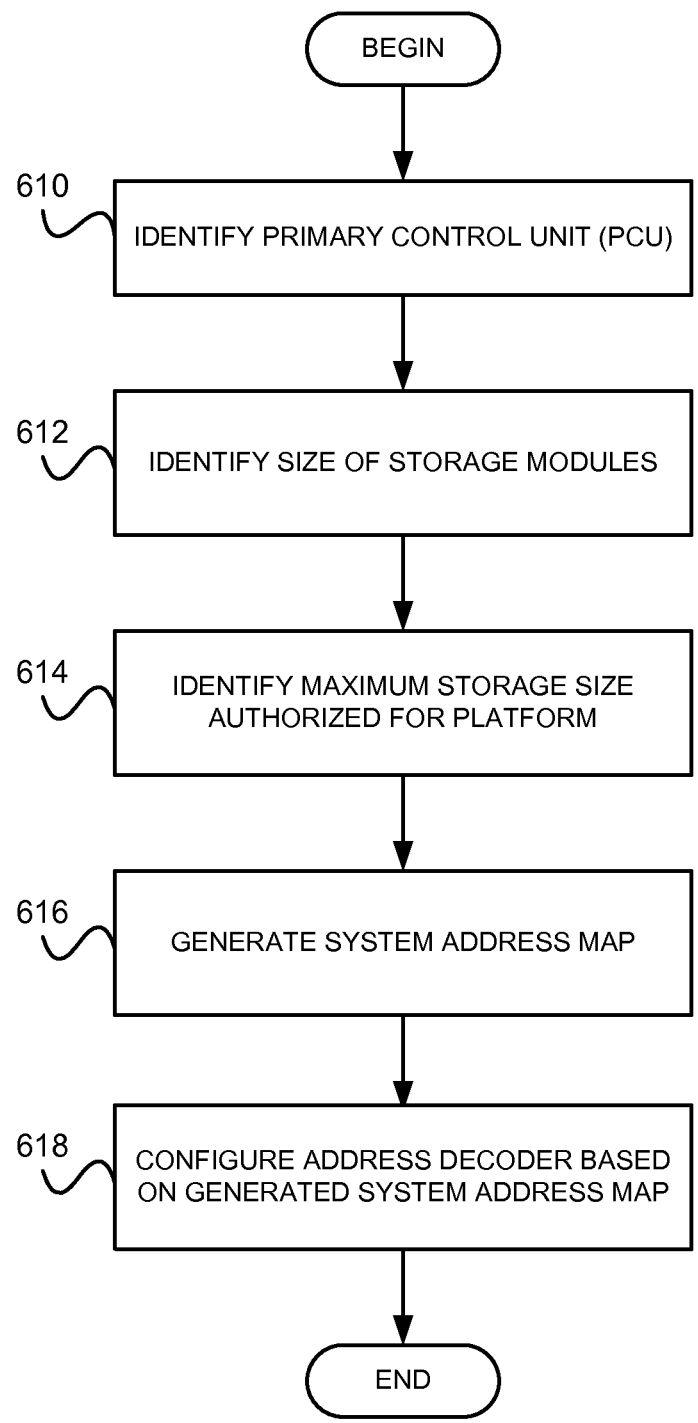
FIG. 6 illustrates a flow diagram of example acts that may be used to configure an address decoder.

FIG. 6 illustrates a flow diagram of example acts that may be used to configure an address decoder. Referring to FIG. 6, at block 610, a primary control unit (PCU) is identified. For example, as shown in FIG. 2, processing logic 200 may include two CUs 300a-b. One of the CUs 300a-b may be designated as a PCU. The CUs 300a-b may negotiate via bus 270 to determine which CU 300 may be designated as the PCU.

At block 612, a size of storage modules may be identified. For example, suppose primary storage 130 includes a DIMM that contains 4 GB of non-volatile memory and a DIMM that contains 4 GB of volatile memory. A CPU 226 executing BIOS 142 may identify both DIMMs and determine that computing device 100 includes a storage module that contains 4 GB of non-volatile memory and a storage module that contains 4 GB of volatile memory.

At block 614, a value that may represent a maximum authorized storage size for a platform is identified. For example, suppose at block 610, CU 300a is identified as the PCU. CU 300a may store information that may be used to identify a maximum amount of non-volatile memory that computing device 100 is authorized to use. The information may be stored in a CU storage 340 associated with CU 300a. The information may include, for example, (1) an authentication code that may be used by the CU 300a to identify a maximum authorized storage size for computing device 100 and/or (2) a value that represents the maximum amount of non-volatile storage that computing device 100 is authorized to use. A CPU 226 executing BIOS 142 may retrieve a value that may represent a maximum authorized storage size for non-volatile storage contained in primary storage 130 by (1) generating a request for the value and (2) issuing the generated request to CU 300a. CU 300a may acquire the generated request from the CPU 226. CU 300a may retrieve the information from the CU storage 340. If the retrieved information includes the authorization code, CU 300a may identify (e.g., generate) a value that represents a maximum amount of non-volatile memory in primary storage 130 that computing device 100 is authorized to use based on the authorization code. CU 300a may send the identified value to CPU 226. If the retrieved information includes the value that represents the maximum amount of non-volatile storage that computing device 100 is authorized to use, the CU 300a may send the retrieved value to the CPU 226.

At block 616, a system address map may be generated. For example, the above CPU 226 may use values identified at blocks 612 and 614 to generate a system address map for computing device 100.

At block 618, an address decoder may be configured based on the generated system address map. For example, after generating the system address map, CPU 226 may forward the generated system address map to a PCU associated with computing device 100. Suppose that CU 300a is the PCU for computing device 100. CU 300a may (1) acquire the system address map from CPU 226 and (2) configure AD 224a. Configuring the AD 224a may include configuring map 400a based on the acquired system address map. Moreover, CU 300a may send the system address map to CU 300b via bus 270. CU 300b may acquire the system address map from CU 300a and configure AD 224b. Configuring AD 224b may include configuring map 400b based on the acquired system address map.

Configuring the maps 400a-b may include, for example, configuring entries 490 in the maps and/or particular fields contained in the entries 490. For example, in an embodiment, CUs 300a-b may configure the attributes field 432 for one or more entries 490 in maps 400a-b, respectively. Here, for example, a CPU 226 executing BIOS 142 may configure the remaining fields in the maps 400a-b.

In another embodiment, CUs 300a-b may configure the attributes field 432 and one or more other fields in maps 400a-b, respectively. Other fields in maps 400a-b configured by the CUs 300a-b may include, for example, base fields 410 and/or limit fields 420. Fields in maps 400a-b not configured by the CUs 300a-b may be configured, for example, by a CPU 226 executing BIOS 142.

Figure 7:
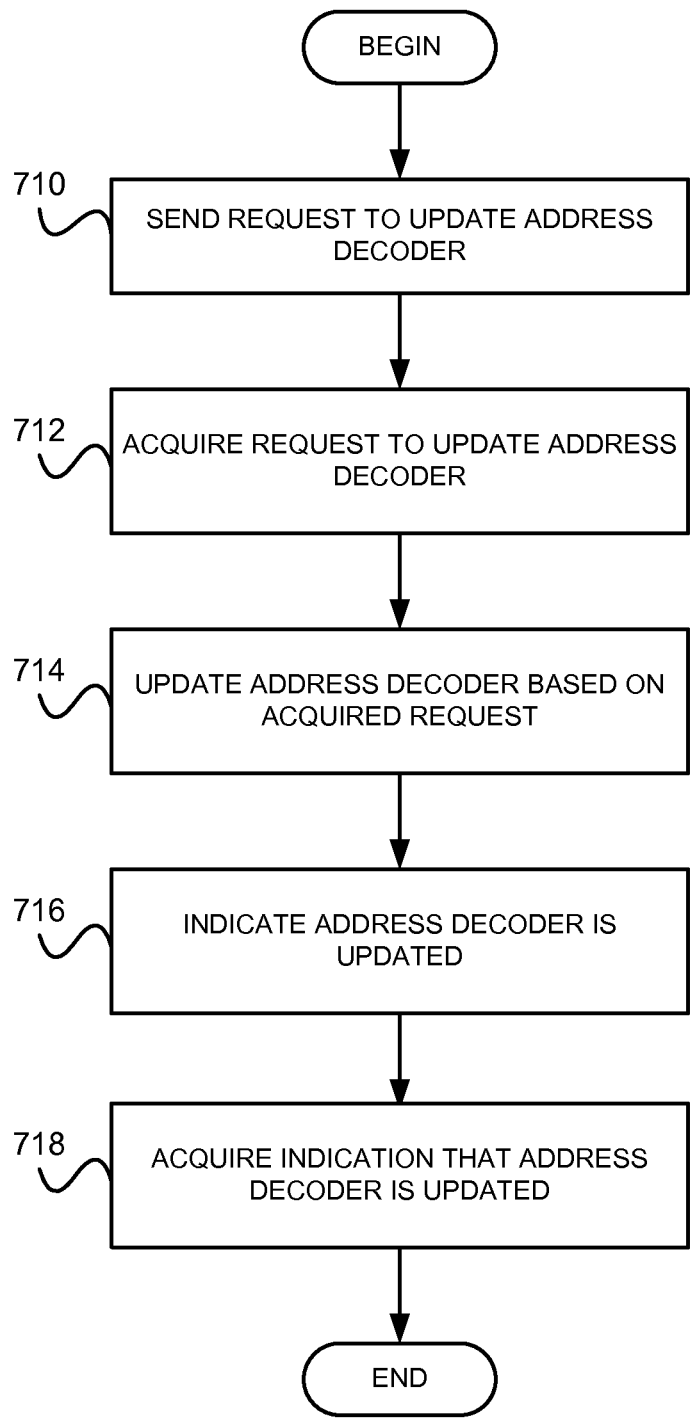
FIG. 7 illustrates a flow diagram of example acts that may be used to update an address decoder.

FIG. 7 illustrates a flow diagram of example acts that may be used to update an address decoder. Referring to FIG. 7, at block 710, a request may be sent to update the address decoder and, at block 712, the request may be acquired. At block 714, the address decoder may be updated based on the request.

For example, suppose CU 300a is identified as the PCU for computing device 100. While executing BIOS 142, CPU 226 may generate a request for a value from CU 300a that indicates an amount and/or type of storage that computing device 100 is authorized to use. CU 300a may receive the request and identify the value. The value may be identified, for example, based on an authentication code that may be stored in a CU storage 340 associated with CU 300a. CU 300a may respond to the request with the identified value. CPU 226 may acquire the identified value from CU 300a and use the identified value to adjust the system address map generated at block 616. CPU 226 may forward the adjusted system address map along with a request to update maps 400a-b to CU 300a. CU 300a may acquire the request and adjusted system address map. CU 300 may process the request which may include, for example, forwarding the adjusted system address map to CU 300b via bus 270. CU 300a and CU 300b may configure maps 400a and 400b, respectively, based on the adjusted system address map.

At block 716, an indication may be provided that indicates the system address map has been updated and, at block 718, the indication may be acquired. For example, after updating map 400b, CU 300b may provide an indication to CU 300a via bus 270 that map 400b has been updated. CU 300a may acquire the indication and, after updating map 400a, CU 300a may determine that both maps 400a-b have been updated. CU 300a may provide an indication to the CPU 226 that indicates that maps 400a-b have been updated. The CPU 226 may acquire the indication and determine that ADs 224a-b have been updated based on the DIMM being added to computing device 100.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5 through 7, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as, for example, CU processing logic 320 and/or processing logic 200. The computer-executable instructions may be stored on one or more tangible non-transitory computer-readable storage media, such as, for example CU storage 340, primary storage 130, and/or secondary storage 150. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
retrieving a value that represents a maximum authorized storage size for a non-volatile storage accessible by an entity contained in a computing device;
acquiring a system address map from the entity, the system address map being generated based on the value; and
configuring an address decoder in the computing device based on the acquired system address map.

2. The method of claim 1, wherein the entity is a central processing unit (CPU) contained in the computing device.

3. The method of claim 1, wherein the entity is executing a basic input/output system (BIOS) associated with the computing device.

4. The method of claim 1, wherein generating the value further comprises:
acquiring an authentication code; and
generating the value based on the authentication code.

5. The method of claim 4, wherein the entity is executing a BIOS associated with the computing device, and
wherein the authentication code is acquired from the entity while the entity executes the BIOS.

6. The method of claim 4, wherein the computing device includes a processor, and wherein the processor includes a control unit and a storage associated with the control unit, and wherein the value is generated by the control unit and the authentication code is stored in the storage associated with the control unit.

7. The method of claim 4, wherein the authentication code includes a key.

8. The method of claim 4, further comprising:
determining the authentication code is valid; and
storing the authentication code.

9. The method of claim 1, wherein the storage contained in the computing device is a primary storage for the computing device.

10. The method of claim 1, wherein the address decoder includes a map, and
wherein configuring further comprises:
configuring the map based on the acquired system address map.

11. One or more tangible non-transitory computer-readable mediums storing executable instructions for execution by processing logic, the medium storing one or more instructions for:
retrieving a value that represents a maximum authorized storage size for a non-volatile storage accessible by an entity contained in a computing device;
acquiring a system address map from the entity, the system address map being generated based on the value; and
configuring an address decoder in the computing device based on the acquired system address map.

12. The medium of claim 11, wherein the entity is a central processing unit (CPU) contained in the computing device.

13. The medium of claim 11, wherein the entity is executing a basic input/output system (BIOS) associated with the computing device.

14. The medium of claim 11, further storing one or more instructions for:
acquiring an authentication code; and
generating the value based on the authentication code.

15. The medium of claim 14, further storing one or more instructions for:
determining the authentication code is valid; and
storing the authentication code.

16. The medium of claim 14, wherein the authentication code is acquired from a processor contained in the computing device that is executing a basic input/output system (BIOS).

17. An apparatus comprising:
a processor;
a central processing unit (CPU) contained in the processor;
an address decoder contained in the processor; and
a control unit contained in the processor, the control unit for:
retrieving a value that represents a maximum authorized storage size for a non-volatile storage contained in the apparatus,
acquiring a system address map from the CPU, the system address map being generated based on the value, and
configuring the address decoder based on the acquired system address map.

18. The apparatus of claim 17, wherein the control unit further:
acquires an authentication code from the CPU, and
generates the value based on the authentication code.

19. The apparatus of claim 18, further comprising:
a storage associated with the control unit,
wherein the control unit further:
stores the authentication code in the storage associated with the control unit.

20. The apparatus of claim 17, further comprising:
a storage associated with the control unit,
wherein the control unit further:
determines the authentication code is valid; and
stores the authentication code in the storage associated with the control unit.

* * * * *